United States Patent
Nishikawa (10) Patent No.: US 7,456,998 B2
(45) Date of Patent: Nov. 25, 2008

(54) IMAGE PROCESSING APPARATUS, IMAGE PROCESSING METHOD, AND COMPUTER PROGRAM

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 10/894,015

(22) Filed: Jul. 20, 2004

(65) Prior Publication Data
US 2005/0018225 A1 Jan. 27, 2005

(30) Foreign Application Priority Data
Jul. 23, 2003 (JP) ............................. 2003-200423

(51) Int. Cl.
*G06F 15/00* (2006.01)
(52) U.S. Cl. ...................... 358/1.9; 358/504; 358/518; 358/519; 358/520; 358/521; 358/522; 358/523; 382/162; 382/167
(58) Field of Classification Search ................. 358/1.9, 358/504, 518–523; 382/162, 167
See application file for complete search history.

(56) References Cited

U.S. PATENT DOCUMENTS

| 6,027,201 | A * | 2/2000 | Edge ........................... 347/19 |
| 6,435,657 | B1 * | 8/2002 | Couwenhoven et al. ....... 347/43 |
| 7,032,989 | B2 | 4/2006 | Nishikawa ................... 347/19 |
| 2003/0112455 | A1 * | 6/2003 | Ueda et al. ................... 358/1.9 |
| 2003/0133606 | A1 * | 7/2003 | Yano et al. ................... 382/162 |
| 2003/0142326 | A1 * | 7/2003 | Burch et al. ................. 358/1.8 |
| 2003/0169438 | A1 * | 9/2003 | Velde et al. .................. 358/1.9 |
| 2004/0114164 | A1 * | 6/2004 | Linder et al. ................ 358/1.9 |

FOREIGN PATENT DOCUMENTS

JP 2004-058624 A 2/2004

OTHER PUBLICATIONS

Office Action from Japanese counterpart application, and English translation thereof.
U.S. Appl. No. 10/913,543, filed Aug. 9, 2004.
U.S. Appl. No. 10/914,247, filed Aug. 10, 2004.

* cited by examiner

*Primary Examiner*—David K Moore
*Assistant Examiner*—Mark R Milia
(74) *Attorney, Agent, or Firm*—Fitzpatrick, Cella, Harper & Scinto (57) ABSTRACT

According to the invention, a value of a high density color material as a decomposition target is decomposed into a combination of the high density color material value and a low density color material value by using a value obtained by color-measuring a patch in which the high density color material and the low density color material are combined, a color measurement value of a patch formed by using the value of the high density color material as a decomposition target is compared with a color measurement value of a patch formed by using the values of the high density color material and the low density color material formed by decomposing, and the values of the high density color material and the low density color material formed by decomposing are corrected on the basis of the comparison result. A color separation table in which a color drift of 5 or more colors corresponding to each color does not occur can be formed.

7 Claims, 7 Drawing Sheets

PRIOR ART

IMAGE PROCESSING APPARATUS, IMAGE PROCESSING METHOD, AND COMPUTER PROGRAM

This application claims priority from Japanese Patent Application No. 2003-200423 filed Jul. 23, 2003, which is hereby incorporated by reference.

BACKGROUND OF THE INVENTION

1. Field of the Invention

The invention relates to an image processing apparatus, an image processing method, and a computer program for correcting a color drift of ink which is caused when a color density decomposing process is executed to high concentration ink.

2. Related Background Art

Figure 7:
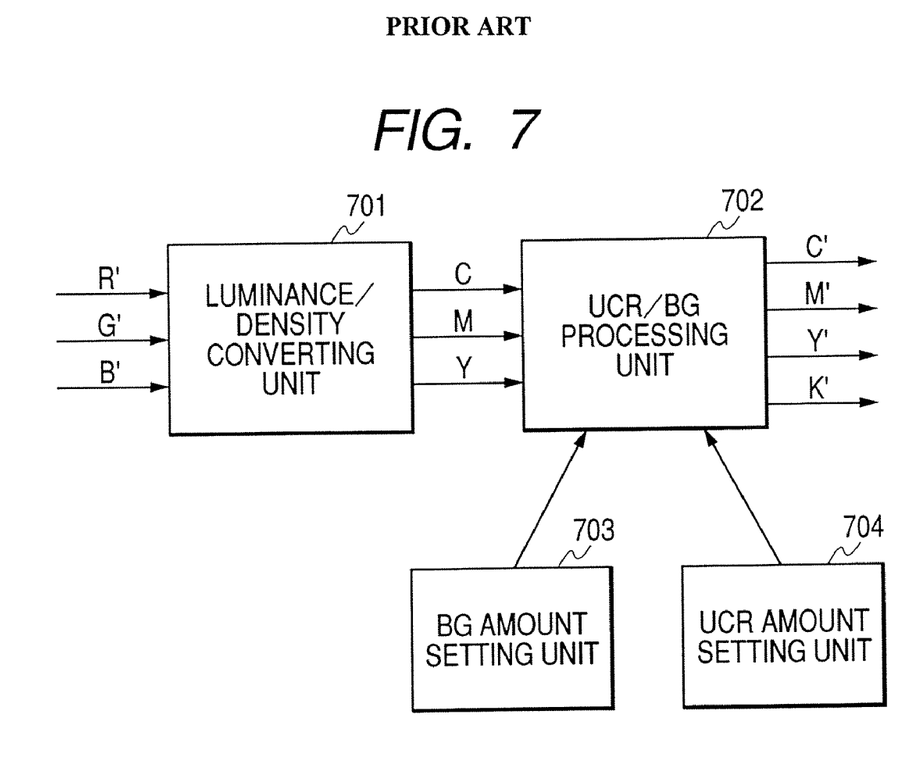
FIG. 7 is a diagram for explaining a color separation image process of a conventional color printer.

Hitherto, a color separation image process of a color printer (hereinafter, referred to as an ink decomposing process) is constructed as shown in FIG. 7. The ink decomposing process will be described hereinbelow with reference to FIG. 7. In FIG. 7, reference numeral 701 denotes a luminance/density converting unit; 702 a UCR/BG processing unit; 703 a BG amount setting unit; and 704 a UCR amount setting unit. 8-bit data R'G'B' as inputted luminance information is converted into concentration data CMY by the luminance/density converting unit 701 on the basis of the following equations.

$$C = -\alpha \log(R'/255) \quad (1)$$

$$M = -\alpha \log(G'/255) \quad (2)$$

$$Y = -\alpha \log(B'/255) \quad (3)$$

where, $\alpha$: arbitrary real number

Subsequently, the CMY data is converted into the following data on the basis of $\beta(\text{Min}(C, M, Y), \mu)$ set into the BG amount setting unit 703 and a value $\mu\%$ set into the UCR amount setting unit 704.

$$C' = C(\mu/100) * \text{Min}(C, M, Y) \quad (4)$$

$$M' = M(\mu/100) * \text{Min}(C, M, Y) \quad (5)$$

$$Y' = Y(\mu/100) * \text{Min}(C, M, Y) \quad (6)$$

$$K' = \beta(\text{Min}(C, M, Y), \mu) * (\mu/100) * \text{Min}(C, M, Y) \quad (7)$$

where, $\beta(\text{Min}(C, M, Y), \mu)$: real number which varies in dependence on $\text{Min}(C, M, Y)$ and $\mu$ A method of inserting K ink can be set on the basis of a value of $\beta(\text{Min}(C, M, Y), \mu)$. A UCR amount and a BG amount largely influence a color gamut of the color printer and granularity of the printer depending on the method of inserting the K ink (Japanese ink). Therefore, the UCR amount and the BG amount become parameters which are very important in the color separating process of the color printer (Japanese Patent Publication No. S62-050015).

In order to raise the granularity of the printer, CMYK data calculated as mentioned above is color-density-decomposed into ink of five colors or more including ink of Lm (light magenta), Lc (light cyan), Lk (light black), and the like which are made by diluting ink of C (cyan), M (magenta), K (black), and the like.

However, there is such a problem that if the color density decomposition of the ink is executed in the color density decomposing process of the color printer, the color obtained after the color density decomposition is drifted from that before the color density decomposition due to a difference of solvents constructing the ink, an influence of a material for increasing viscosity of the ink, and the like. Hitherto, correction of the color drift for such a problem is not considered.

SUMMARY OF THE INVENTION

The invention is made in consideration of the above problem and it is an object of the invention to provide an image processing apparatus, an image processing method, and a computer program, in which a table which has been color-separated into four colors is separated, that is, with respect to each of materials of C, M, and K, one of them, a combination of two of them, or all of the materials of three colors are separated into a combination of high density ink and low density ink and the color drift is corrected, thereby forming a color separation table of five or more colors corresponding to each color in which the color drift or the like does not occur.

To accomplish the above object, according to the invention, there is provided an image processing apparatus comprising:

color density decomposing means for decomposing a value of a color material of high concentration serving as a decomposition target into a combination of the value of the high density color material and a value of a low density color material by using a value obtained by color-measuring a patch in which the high density color material and the low density color material are combined;

comparing means for comparing a color measurement value of a patch formed by using the value of the high density color material serving as a decomposition target with a color measurement value of a patch formed by using the values of the high density color material and the low density color material which are formed by decomposing the high density color material by the color density decomposing means; and color correcting means for correcting the value of the high density color material and the value of the low density color material formed by the color density decomposing means on the basis of a result of the comparison by the comparing means.

Another object of the invention is to provide novel functions. Claims and other features of the present invention to accomplish the above objects will become apparent from the following detailed description of the specification with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Embodiment 1

Figure 1:
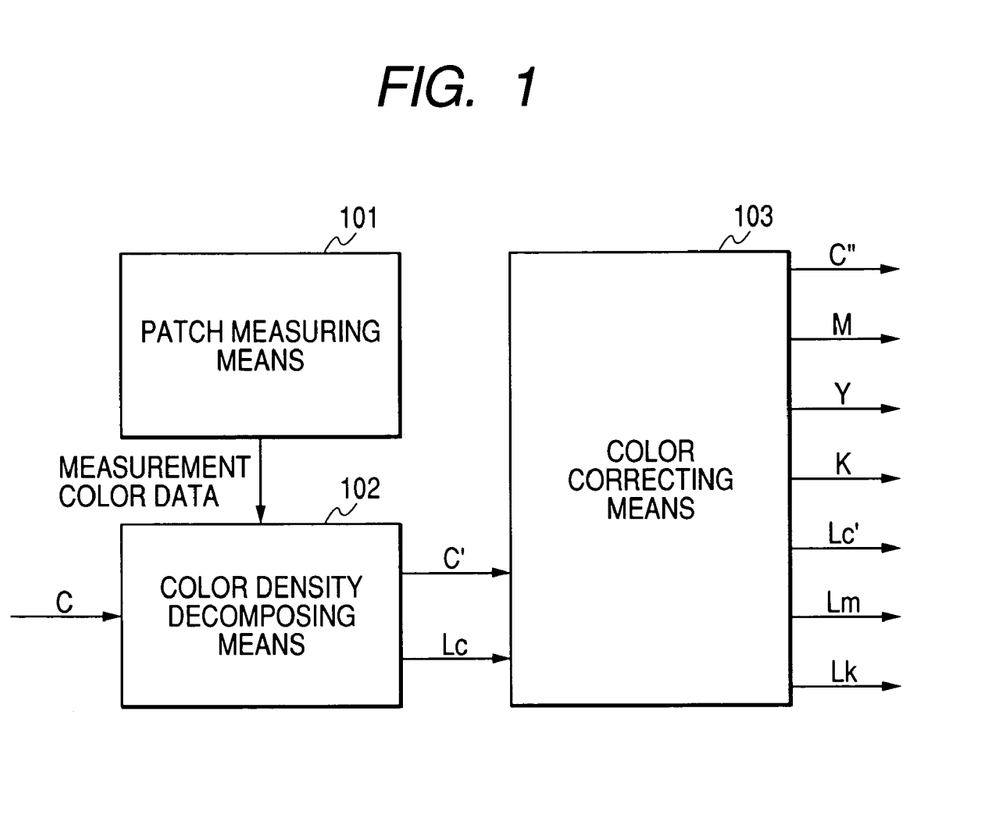
FIG. 1 is a diagram showing a construction of a color separation system of a color printer in the embodiment of the invention.

FIG. 1 is a block diagram showing a whole construction of a color separation system of a color printer in the embodiment of the invention.

As shown in FIG. 1, the color separation system of the color printer in the embodiment is constructed by patch measuring means 101, color density decomposing means 102, and color correcting means 103. The patch measuring means 101 is means for combining high density ink of C (cyan), M (magenta), K (black), and the like and low density ink of Lc (light cyan), Lm (light magenta), Lk (light black), and the like so that the ink of the same hue is combined, outputting a patch according to such a combination, and measuring its color. The color density decomposing means 102 inputs one of the high density ink of C (cyan), M (magenta), K (black), and the like, a combination of two of them, or a combination of all of the three colors and decomposes, for example, C (cyan) into a combination of C (cyan) and Lc (light cyan) on the basis of color measurement data obtained by the patch measuring means 101. Further, the color correcting means 103 is means for detecting a drift of the combination of C (cyan) and Lc (light cyan) decomposed by the color density decomposing means 102 from the color constructed only by original C (cyan) and correcting the color drift by adding or subtracting color materials other than C (cyan) and Lc (light cyan) to/from the combination of C (cyan) and Lc (light cyan). Although the example of C (cyan) has been shown here, such processes are similarly executed also with respect to the color density decomposition of M (magenta) and K (black).

Figure 2:
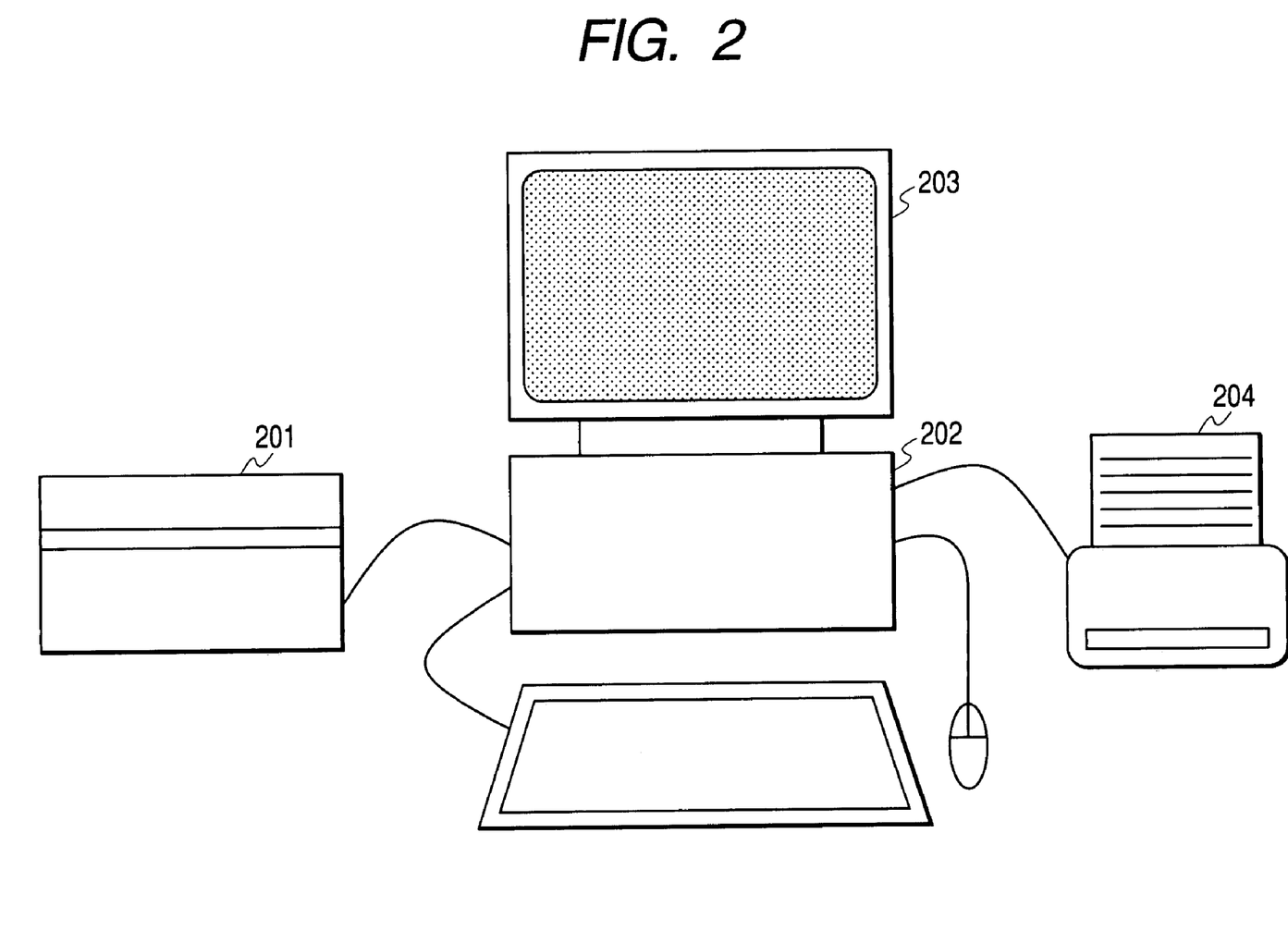
FIG. 2 is a diagram showing an example of a color separation image processing system in the embodiment of the invention.

FIG. 2 shows a color separation image processing system as an example of the embodiment of the invention. In the diagram, reference numeral 201 denotes a spectrophotometer as an image signal input apparatus and 202 indicates a personal computer as a computer system which can input an image signal read out by the spectrophotometer 201 and edit and store it. Further, the personal computer 202 can allow the obtained image signal to be displayed by a display 203 or outputted from a color printer 204.

Figure 3:
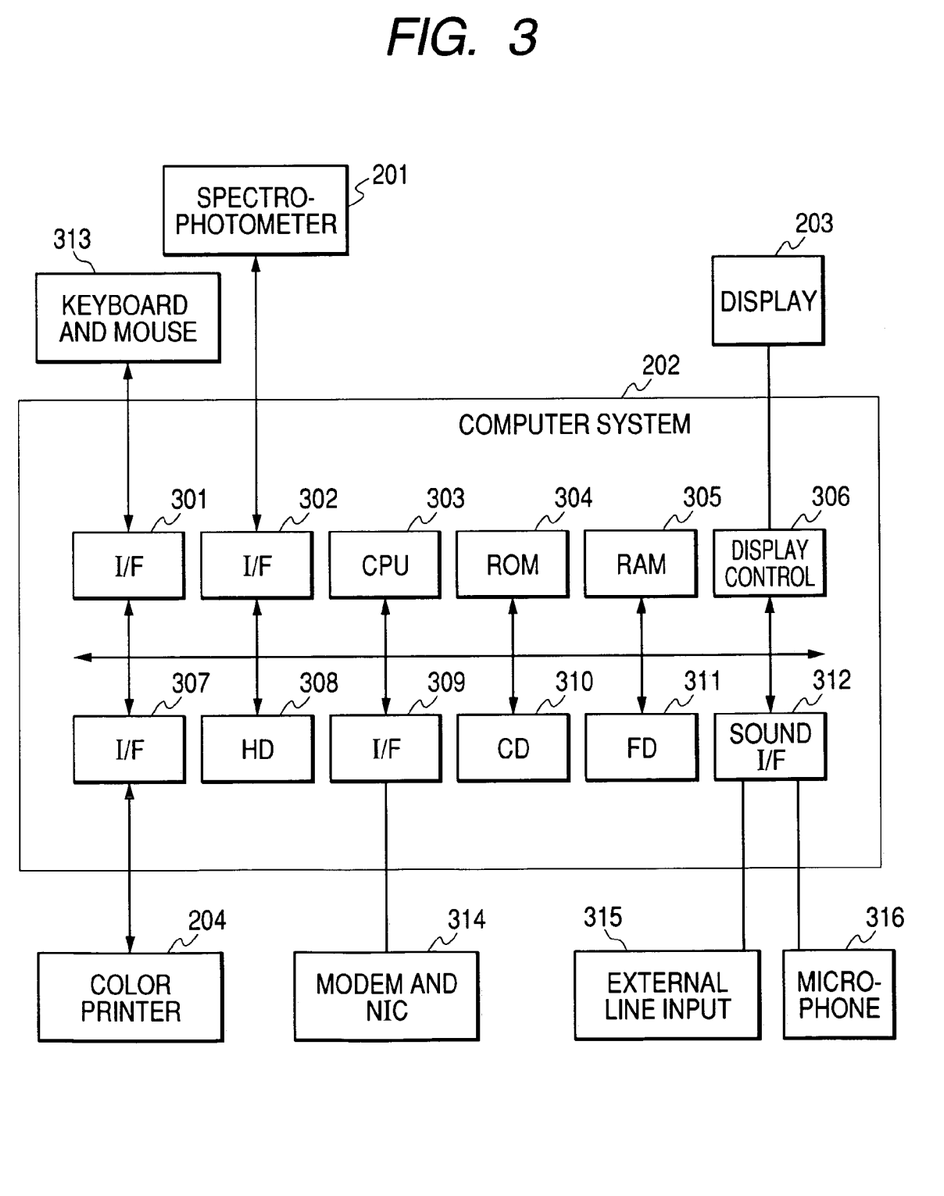
FIG. 3 is a diagram showing each module of the color separation image processing system shown in FIG. 2.

FIG. 3 is a block diagram in which a principal portion in the construction of FIG. 2 is shown by a block serving as a functional module.

In the diagram, reference numeral 301 denotes an interface (I/F) for connecting a mouse/keyboard 313 which is used by the user to input various manual instructions or the like to the computer system 202 and 302 indicates an interface (I/F) for connecting the computer system 202 to an image input apparatus such as a spectrophotometer 201 or the like.

Reference numeral 303 denotes a CPU which can control the operation of each block in the system or execute a program stored in the system.

Reference numeral 304 denotes a ROM for previously storing the necessary image processing program and the like.

Reference numeral 305 denotes a RAM for temporarily storing the program or image data as a processing target in order to execute processes by the CPU 303.

Reference numeral 306 denotes a display control apparatus for allowing an image as a processing target to be displayed or controlling the display apparatus 203 for displaying a message for the operator.

Reference numeral 307 denotes an interface (I/F) for connecting the computer system 202 to the color printer 204.

Reference numeral 308 denotes a hard disk (HD) which can previously store a program or image data which is transferred into the RAM 305 or the like or store the image data obtained after the process.

Reference numeral 309 denotes an interface (I/F) for connecting the computer system to a transmitting apparatus 314 such as modem, network card, or the like which can transmit various data that is held in each section of the computer system to an external apparatus or receive various data from the external apparatus. Reference numeral 310 denotes a CD drive which can read out data stored in a CD (CD-R, CD-RW, DVD) as one of external storing media or write data therein. Reference numeral 311 denotes an FD drive which can read out or write data from/into an FD in a manner similar to the CD drive 310. If an image editing program, printer information, or the like has been stored in a CD, FD, DVD, or the like, such a program is installed into the HD 308 and transferred into the RAM 305 as necessary. Reference numeral 312 denotes a sound interface (I/F) to which an external line input 315 and a microphone 316 are connected and which can input audio data from the outside.

Figure 4:
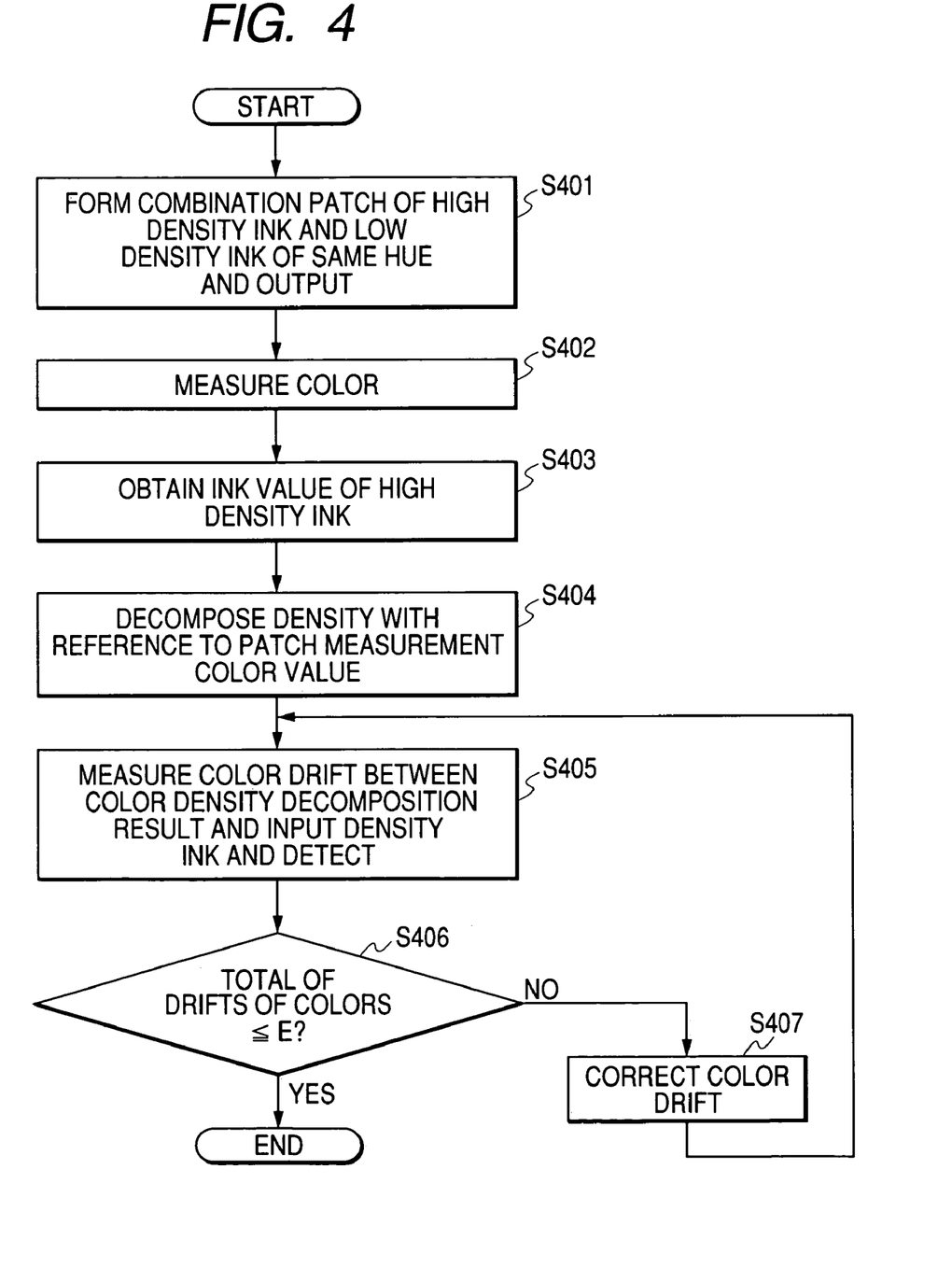
FIG. 4 is a flowchart showing the operation of a color separation image process in the embodiment of the invention.

FIG. 4 is a flowchart showing an operating procedure for realizing the first embodiment in the construction shown in FIGS. 2 and 3. A computer-executable program describing the procedure shown in the flowchart of FIG. 4 has previously been stored in the ROM 304 or a program which has previously been stored in the external storing device 308 is read out and stored into the RAM 305, and thereafter, the program is executed by the CPU 303, thereby realizing the embodiment.

A flow of processes in the embodiment will now be described hereinbelow with reference to the flowchart shown in FIG. 4.

Figure 5:
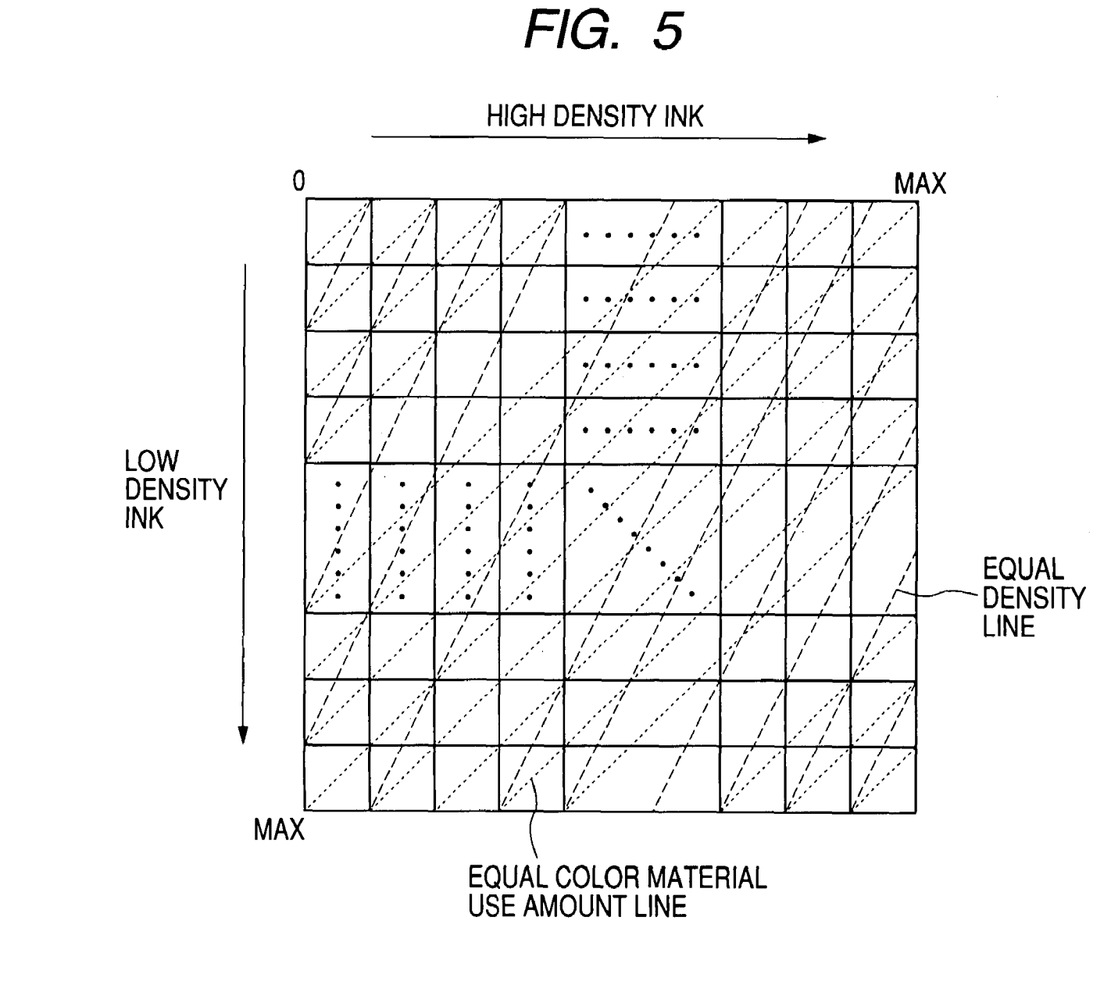
FIG. 5 is a diagram showing an example of a patch for density color separation in the embodiment of the invention.

First, in step S401, a patch in which high density ink as a decomposition target and low density ink of the same hue as that of the high density ink are combined is formed and outputted. A patch image which is formed in step S401 has, for example, a two-dimensional construction as shown in FIG. 5. The patch image is constructed by a patch in which one axis indicates the high density ink, the other axis indicates the low density ink, and an ink value of each ink is plotted on each axis. For example, assuming that the printer executes a process of 8 bits, the patch in which the ink value has been plotted is a gradation patch in which the possible values as an ink value exist in a range from 0 to 255 and the values 0 to 255 are uniformly divided. Naturally, the patch in the portion of a large color change can be finely divided, the patch in the portion of a small color change can be coarsely divided, or an increasing ratio in the range from 0 to 255 can be also set to be uneven, or the like.

Subsequently, in step S402, a density value on a lattice point of the patch formed in step S401 is color-measured by using the spectrophotometer 201 and concentration data for each ink value including color mixture of the high density ink and the low density ink is obtained from the read-out image signal. The obtained density data for each ink value including the color mixture of the high density ink and the low density ink can be edited and stored by the personal computer 202. It is stored into the RAM 305 in order to execute subsequent processes. If a capacity is large, it is stored into the external storing device 308 or the like.

In step S403, the ink values of the high density ink of C (cyan), M (magenta), K (black), and the like serving as decomposition targets are obtained. The ink values of the high density ink of C (cyan), M (magenta), K (black), and the like which are described here denote the ink values written in the color separation table of 4 colors separated by using the well-known technique as mentioned above. The inputted ink values of the high density ink are stored into the RAM 305 in order to execute the subsequent processes.

Figure 6:
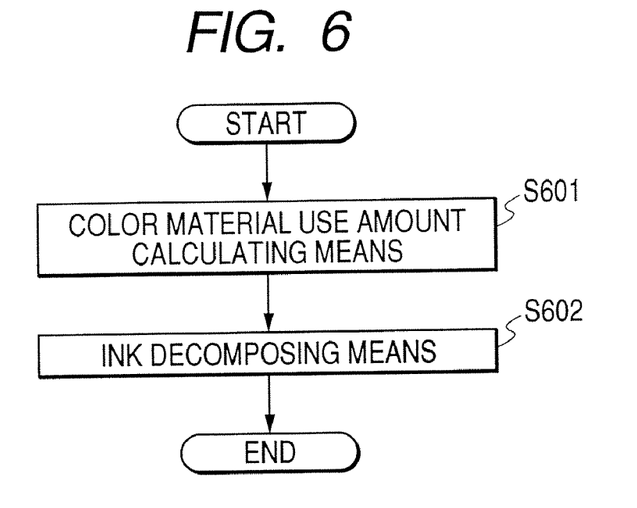
FIG. 6 is a flowchart showing details of a process which is executed in step S404 in FIG. 4.

In next step S404, the ink values of the high density ink inputted in step S403 are color-density-decomposed to the ink values of the high density ink and the ink values of the low density ink by using the density data of the patch for density color separation which has been color-measured in step S402. FIG. 6 shows a flowchart showing details of the process which is executed in step S404. The process which is executed in step S404 will now be described hereinbelow with reference to FIG. 6.

First, in step S601, a total use amount of the color materials when the high density ink is decomposed into the high density ink and the low density ink is calculated. The total use amount of the color materials of the whole CMYK has been predetermined every recording paper. The use amount of the color material of each ink after the decomposition is determined by a ratio of the high density ink before the decomposition to the total use amount of the color materials of the whole CMYK. For example, it is assumed that when the maximum use amount of the color materials of the plain paper is equal to 180% and the pixel of certain coordinates on the image is reproduced by using only cyan, magenta, yellow, and black as high density ink, each high density ink can be expressed by 100% in total comprising C (cyan) of 50%, M (magenta) of 30%, Y (yellow) of 10%, and K (black) of 10%. Since the maximum use amount of the color materials of the plain paper as recording paper which is used is equal to 180%, the ink of 80% as a residual amount can be deposited onto the plain paper as recording paper because [180−(50+30+10+10)=80 (%)]. Now, assuming that the color density decomposition is performed with respect to only C (cyan) and M (magenta), the C (cyan) ink of 50% and the M (magenta) ink of 30% can be further added because of the ratio (5:3) of the ink amounts of C (cyan) and M (magenta) before the decomposition. Therefore, in this case, the total use amount of the color materials at the time of decomposing the high density ink into the high density ink and the low density ink is equal to: 100% in total of C (cyan) and Lc (light cyan); 60% in total of M (magenta) and Lm (light magenta); 10% of Y (yellow); and 10% of K (black).

Subsequently, in step S602, the ink value of the low density ink corresponding to the ink value of the high density ink serving as a decomposition target inputted in step S403 or a combination of the ink value of the high density ink and the ink value of the low density ink is obtained from a cross point of an equal density line written in FIG. 5 and the color material use amount set in step S601. The ink value of the low density ink or the combination of the ink value of the high density ink and the ink value of the low density ink is stored into the RAM 305 in order to execute the subsequent processes or if the capacity is large, it is stored into the external storing device 308 or the like.

After step S602, the process in step S404 is finished and the processing routine advances to step S405.

Figure 8:
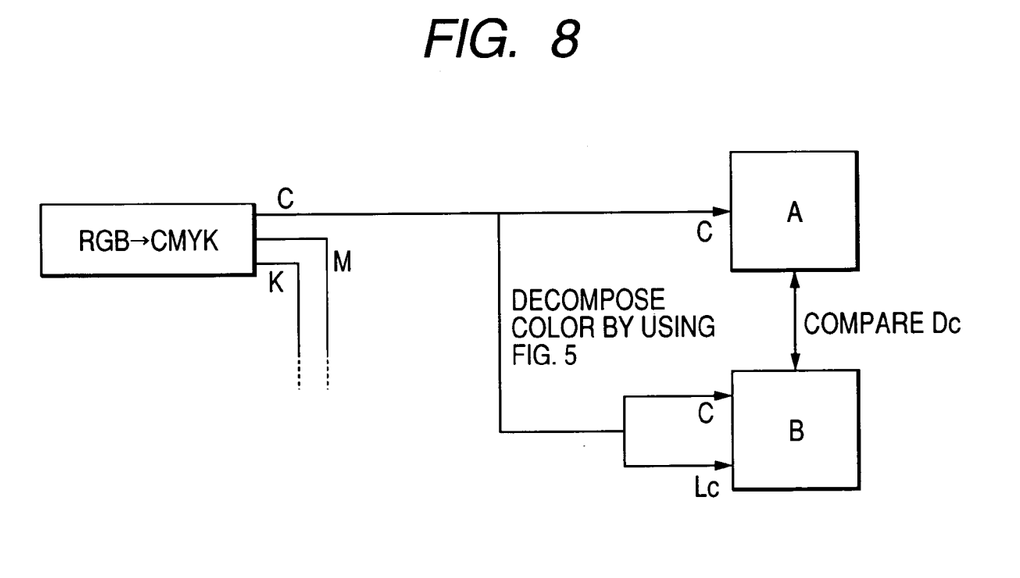
FIG. 8 is a diagram for explaining a comparison between a patch of inputted high density ink and a patch as a result of the color density decomposition.

The patch of the ink value of the low density ink or the patch (block B in FIG. 8) of the combination of the ink value of the high density ink and the ink value of the low density ink obtained in step S404 is actually printed in step S405. Each patch is measured by the spectrophotometer 201 and each obtained color component density data such as Dc (cyan component density), Dm (magenta component density), Dy (yellow component density), Dvis (visual sense density), or the like is compared with each color component density data obtained by color-measuring the patch (block A in FIG. 8) of the ink value of the high density ink serving as a decomposition target which has been inputted in step S403 (refer to FIG. 8), and a difference is obtained. The obtained difference data is stored into the RAM 305 in order to execute the subsequent processes.

In step S406, whether or not the total amount of color drift of each ink detected in step S405 is equal to or less than a predetermined threshold value E is discriminated. If the total amount of the color drift of each ink is equal to or less than the predetermined threshold value E, since a color drift hardly occurs, the processing routine is finished. If the total of the color drift of each ink is larger than the predetermined threshold value E in step S406, since such a value is at a level which needs a color drift amount correcting process, the processing routine advances to step S407. In step S407, correction is made in accordance with the drift (difference) of each color component density calculated in step S405. At this time, the high density ink serving as a decomposition target and the low density ink of the same hue as that of the high density ink are held as they are and an ink value of each of the other color materials is adjusted, thereby correcting the drift after completion of the color density decomposition. This is because there are such characteristics that each of the ink components of yellow, magenta, cyan, black, light cyan, light magenta is not an ideal recording material which does not perfectly contain other color components but contains a small amount of other color components. Therefore, the color drift is corrected by adjusting the amounts of ink (magenta, light magenta, yellow, black) other than the cyan component, that is, by adjusting the amount of cyan component contained in the ink other than the cyan ink in order to correct the color drift of the cyan component. For example, in the case of adjusting the combination of cyan and light cyan, cyan and light cyan themselves serving as decomposition targets and as targets to be subjected to the color drift correction are not changed but amounts of color materials of magenta, light magenta, yellow, black, and light black are added or subtracted, thereby adjusting the color drift. Thus, the color drift adjustment of the cyan component is finished. Subsequently, the correction targets are set to magenta and light magenta and amounts of color materials of cyan, light cyan, yellow, black, and light black are adjusted, thereby correcting the color drift. This is true of the case of black.

After step S407, the processing routine is returned to step S405. Each color component density data of the ink values obtained in step S403 is compared again with each color component density data of the ink values decomposed by using the color separation table formed in step S407. The color drift is evaluated. The color drift correcting process is repeated until the condition of step S406 is satisfied.

Second Embodiment

In the first embodiment, in the color measurement in step S402, the density values are color-measured and the density data is referred to for the color density decomposition in step S602. However, the invention is not limited to such a method.

That is, a lightness value (L*) can be used as a color measurement value. In this case, naturally, by drawing an equal lightness line onto the patch image as shown in FIG. 5, a solution of each color density decomposition can be found out from a cross point with an arbitrary color material use amount.

Third Embodiment

Although each color component density data is used for the color drift detection in step S405 in the first and second embodiments, the invention is not limited to it.

That is, the color drift can be calculated by evaluating the difference data on the CIE-LAB or XYZ space. In this case, it is preferable that the high density ink as a decomposition target in step S406, the low density ink of the same hue as that of the high density ink, and each ink of other color materials are measured by using the spectrophotometer 201, the measured data is converted into the data of the CIE-LAB or XYZ space, and the evaluation is performed.

The invention is not limited to only the apparatus and method for realizing the foregoing embodiments but also incorporates a case where program codes of software for realizing the embodiments are supplied to a computer (CPU or MPU) in the system or apparatus and the computer in the system or apparatus makes the foregoing various devices operative in accordance with the program codes, thereby realizing the foregoing embodiments.

In this case, the program codes themselves of the software realize the functions of the embodiments mentioned above. The program codes themselves and means for supplying the program codes to the computer, specifically speaking, a storing medium in which the program codes have been stored are incorporated in the invention.

As such a storing medium for storing the program codes, for example, a floppy disk, a hard disk, an optical disk, a magnetooptic disk, a CD-ROM, a magnetic tape, a non-volatile memory card, a ROM, or the like can be used.

The program codes are also incorporated in the invention not only in the case where the computer controls the various devices in accordance with only the supplied program codes, so that the functions of the embodiments as mentioned above are realized but also in the case where the embodiments as mentioned above are realized in cooperation with an OS (operating system) by which the program codes are operating on the computer, another application software, or the like.

Further, the invention also incorporates a case where the supplied program codes are stored into a memory provided for a function expanding board of a computer or a function expanding unit connected to the computer and, thereafter, a CPU or the like provided for the function expanding board or the function expanding unit executes a part or all of actual processes on the basis of instructions of the program codes, and the embodiments as mentioned above are realized by those processes.

Any construction including at least one of the foregoing various feature points is also incorporated in the purview of the invention.

As described above, according to the invention, in the table which has been color-separated into four colors, with respect to C, M, and K, by independently decomposing one of them, a combination of two of them, or all of the three color materials, respectively, and correcting the color drift, the color separation table of five or more colors corresponding to each color in which the color drift or the like does not occur can be formed.

What is claimed is:

1. An image processing apparatus comprising:
    color density decomposing means for decomposing a value of a color material of high density of a first hue serving as a decomposition target into a combination of the value of the high-density color material of the first hue and a value of a low-density color material of the first hue by using a value obtained by color-measuring a patch in which the high-density color material of the first hue and the low-density color material of the first hue are combined;
    comparing means for comparing a color measurement value of a patch formed by using the value of the high-density color material serving as a decomposition target with a color measurement value of a patch formed by using the values of the high-density color material and the low-density color material which are formed by said color density decomposing means decomposing the high-density color material; and
    color correcting means for correcting a color deviation of the first hue as between before and after the color density decomposition by said color density decomposing means by adjusting an amount of a color material of a second hue that is different from the first hue, on the basis of a result of the comparison by said comparing means.

2. An image processing apparatus according to claim 1, wherein the first hue is one of C (cyan), M (magenta), and K (black).

3. An image processing apparatus according to claim 1, wherein the value obtained by color-measuring the patch in which the high-density color material of the first hue and the low-density color material of the first hue are combined and the color measurement value which is compared by said comparing means are density values.

4. An image processing apparatus according to claim 1, wherein the value obtained by color-measuring the patch in which the high-density color material of the first hue and the low-density color material of the first hue are combined and the color measurement value which is compared by said comparing means are lightness values.

5. An image processing apparatus according to claim 1, wherein said color density decomposing means comprises:
    color material use amount calculating means for calculating a total color material use amount at the time when the high-density color material of the first hue and the low-density color material of the first hue are combined; and
    color material calculating means for calculating an amount of the high-density color material of the first hue and an amount of the low-density color material of the first hue on the basis of the total color material use amount and the value obtained by color-measuring the patch in which the high-density color material of the first hue and the low-density color material of the first hue are combined.

6. An image processing method comprising:
    a color density decomposing step of decomposing a value of a color material of high density of a first hue serving as a decomposition target into a combination of the value of the high-density color material of the first hue and a value of a low-density color material of the first hue by using a value obtained by color-measuring a patch in which the high-density color material of the first hue and the low-density color material of the first hue are combined;
    a comparing step of comparing a color measurement value of a patch formed by using the value of the high-density color material of the first hue serving as a decomposition target with a color measurement value of a patch formed by using the values of the high-density color material of the first hue and the low-density color material of the first hue which are formed by decomposing the high-density color material of the first hue in said color density decomposing step; and a color correcting step of correcting a color deviation of the first hue as between before and after the color density decomposition in said color density decomposing step by adjusting an amount of a color material of a second hue that is different from the first hue, on the basis of a result of the comparison made in said comparing step.

7. A computer-readable storage medium encoded with a program for allowing a computer to execute the steps of the image processing method according to claim 6.

* * * * *